Feb. 14, 1950        D. P. BROWN        2,497,255

DIFFERENTIAL PRESSURE INDICATOR

Filed Feb. 25, 1946        2 Sheets-Sheet 1

INVENTOR.-
D. P. Brown
BY
O. Martin
ATTORNEY.

INVENTOR:
D. P. Brown
BY
J. J. Martin
ATTORNEY.

Patented Feb. 14, 1950

2,497,255

UNITED STATES PATENT OFFICE 2,497,255

DIFFERENTIAL PRESSURE INDICATOR

David P. Brown, Los Angeles, Calif.

Application February 25, 1946, Serial No. 650,071

4 Claims. (Cl. 73—407)

The present invention is directed to improvements in devices for indicating pressure variations in pipe lines and the like.

It is the object of the invention to provide a pressure indicating device in which the most minute variations in pressure are translated into an extended rotation of the dial indicator of the device.

To this end the invention consists in the combinations hereinafter fully described and illustrated in the accompanying drawings, of which:

Fig. 1 is a plan view of a structure embodying the invention and with portions of the casing thereof broken away in order to disclose the interior mechanism thereof.

Fig. 5 is a right-hand end view of the device of Fig. 1 and with portions of the casing thereof broken away for the sake of clearness; and Fig. 6 is a detailed view of a portion of the central portion of Fig. 4.

Figure 2:
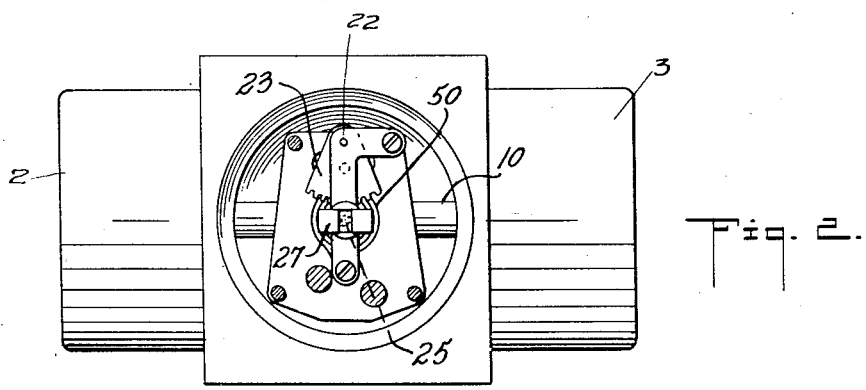
Fig. 2 is a front elevational view of a portion of the device taken substantially on line 2—2 of Fig. 1 in the direction of the arrow.
Figure 3:
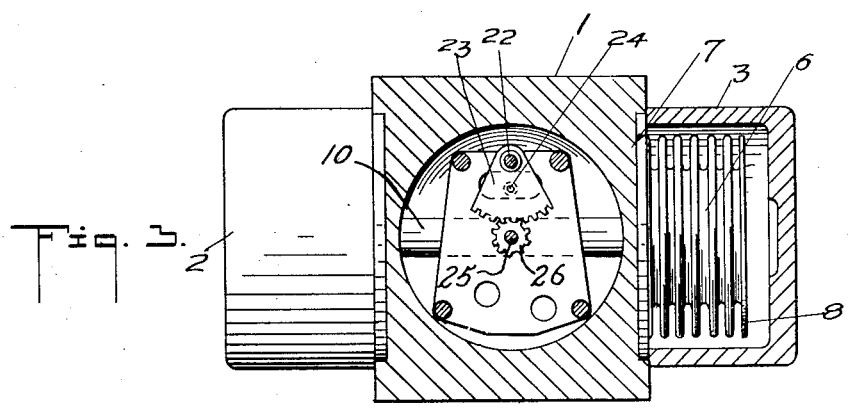
Fig. 3 is a similar view taken substantially on line 3—3 of Fig. 1.

The structure of my invention, in the form illustrated in the drawings comprises a framing, within which is mounted a fluid pressure actuated mechanism, and an indicating mechanism is supported by said framing. The latter is divided into three parts, namely a substantially square center portion 1 supporting end casings 2, 3, which preferably may be exactly alike. Conduits 4, 5 lead from a fluid supply line A into the two end casings, within which are mounted bellows 6. As the mechanism preferably is the same within the two end casings, only the interior of one is fully illustrated and the description of one pertains equally to the other.

One end of the bellows 6 is fastened to the inner casing wall 7 and the other end thereof is secured to an annular, recessed frame 8, in the bottom of which is seated the head 9 of a stem 10. It is important to note that the stem 10 extends freely through the wall 7 and that, in this manner, the space within the center portion 1 communicates with the space within the bellows. A small bellows 11 is seated on the head 9 of the stem for the purpose which will be explained below, and the outer end of this bellows is shown tightly closed. It is also noted that passages 9ª extend from the large to the small bellows. A stud 12 is seated to project laterally from near the center of the stem 10, substantially as shown. The space within the center portion 1 and the bellows is filled with a suitable fluid.

From the foregoing brief description it should be clear to anyone familiar with the art that any pressure variation within the pipe line A is effective to compress one bellows 6 or the other, thereby to move the stem 10 axially for the purpose of operating the indicating mechanism, as will now be explained in detail.

A pivot 20, below the stud 12 and in axial parallel relation thereto, carries an arm 21, which rises above the stud 12 and is in contact with one side thereof. On a pivot 22, above the pivot 20 and parallel therewith, is hung a gear segment 23, and a pin 24 projects laterally therefrom along the opposite side of the arm 21, intermediate the stud 12 and the pivot 22. On a short shaft 25 is mounted a gear pinion 26, in mesh with the gear teeth of the segment 23, and a permanent magnet 27 is secured to this shaft. The pivot 22 is, for the sake of clearness, omitted in Fig. 1.

Figure 4:
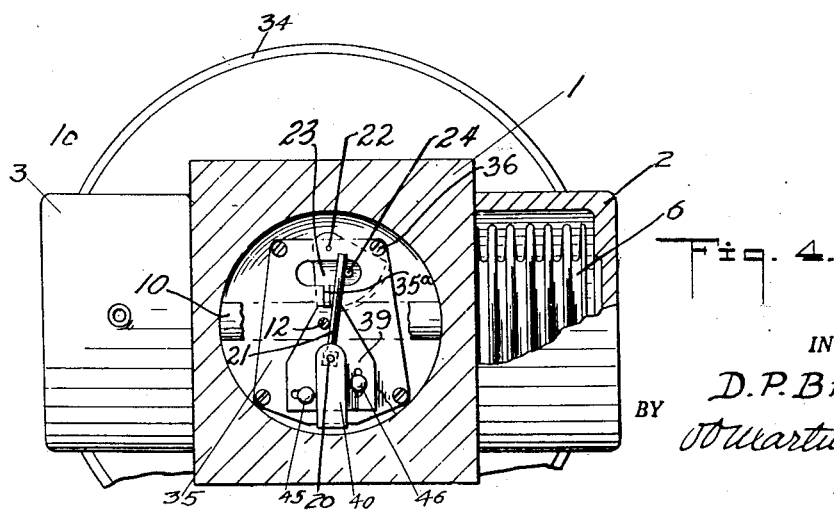
Fig. 4 is a rear elevational view of the device taken substantially on line 4—4 of Fig. 1 in the direction of the arrow.

The conduit 5 carries fluid to the enclosed space within the end casing 3 surrounding the bellows 6, causing the latter to become compressed and to move the stem 10 into the position indicated in Fig. 1. It is assumed, for the purpose of this description, that this represents the position in which the bellows are symmetrically positioned relative to the center of the framing and the pointer B of the device is set to indicate normal flow conditions through the supply line A. An increase of pressure on the high pressure side of the line will cause increased flow into the casing 3 and further compression of the bellows 6 therein. The stem 10 is thereby moved axially through the aforenamed instrumentalities to impart oscillating movement to the arm 21, the segment 23 and, through the pinion 26, to the permanent magnet 27. Such advanced position of the parts is indicated in Fig. 4.

A similar magnet 28 is mounted on the indicator shaft 29, without the framing 1 and in axial alignment with the shaft 25. In the side wall 30 is seated a non-magnetic inset 31, which takes a position between the two magnets. It should be clear to anyone familiar with the art that the second magnet 28 will follow any rotative movement imparted to the magnet 27. The indicator framing 34 is suitably secured to the casing 1 and the shaft 29 is mounted to rotate in a bearing bracket 32 within this framing. The pointer B is placed on the end of this shaft in front of a dial 33.

A careful study of the drawings will show that a slight movement of one of the bellows 6 is, in the manner described, translated into a considerably greater movement. It is also noticed that the distance that the arm 21 is moved by the stud 12 results in a greatly increased movement by the arm of the segment 23. Finally, that the gear connection from the segment to the magnet shaft 25 is calculated to impart considerably greater rotation to the latter. In this manner, it is seen that a very slight variation in the flow through the pipe line A is translated into a greatly increased movement of the pointer B.

Below the heads 9 of the stem 10 are placed annular valve members 13 for contact with seats 14 of the inner partitions 7. The purpose of these members is to limit the axial movement of the stems by contact with the seats 14. In this manner all danger of rotating the indicator and the connecting mechanism thereof beyond the capacity of the device is eliminated, and the bellows protected from taking a set.

Means is provided for adjusting the movement of the pointer B relative to the movement of the bellows in order to correct any slight error in the general adjustment of the device. Such fine adjustment may be effected by shifting the position of the pivot 20, and this may be done in the following manner:

A plate 35 is shown mounted on posts 36, and it is perforated near the top thereof to receive the segment pivot 22. From a smaller plate 39 projects a bracket 40 which, together with the plate 39, forms a frame having aligned perforations forming bearings for the pivot 20. This frame is movable horizontally and vertically on the plate 35 for the purpose of changing the position of the pivot 20 as may be required in order to effect adjustment of the pointer movement relative to the bellows movement. A stud 41, riding in a vertical slot 35ᵃ of the plate 35, guides the upper end of the frame during such adjusting movements.

As a means of effecting such pivot movement, I have shown two posts 42, 43 seated in and extending from the plate 35 through the wall of the indicator framing 34, see also Figs. 5 and 6. Eccentrically seated in the inner ends of these posts are studs 45, 46, which ride in relatively horizontal and vertical slots 39ᵃ, 39ᵇ of the plate 39. Rotation of one of these posts is effective to move the frame to shift the pivot 20 horizontally or vertically and so to adjust the movement of the pointer. When perforations are made in the dial in alignment with these posts, it is seen that the final, fine adjustment of the device may be effected after the assembly thereof has been completed. It then only remains to mount the glass cover 48 in position. It may be well to mount a coil spring 50 on the pivot of the gear pinion 26, the purpose of which is to urge return movement of the parts advanced by the stem 10 of the bellows.

It was above stated that the space within the central casing 1 and the bellows is filled with a suitable liquid. This liquid is subject to expansion or contraction due to temperature variations thereof and it is in order to compensate for such expansions and contractions that the small bellows 11 are placed on the ends of the stem 10. If the small bellows were omitted it is seen that, since the large bellows are rigidly secured to the ends of the stem 10 and so are incapable of axial expansion or contraction in response to such variation in volume of the enclosed liquid they would have to expand or contract in a direction transverse to the stem axis. Such transverse distortions would soon rupture or otherwise damage the large bellows and so render the device inoperative. But the small bellows are free to expand or contract axially to relieve such pressure variations within the large bellows. All danger of damage to the large bellows is thereby eliminated.

I claim:

1. A pressure indicating device comprising, a casing, a stem extending through said casing and freely extending through the walls thereof, bellows seated on the outer surfaces of the casing walls in axial alignment with said stem, members closing the ends of said bellows and secured to the ends of said stem, the space within said casing and the said bellows being filled with a liquid, a stud laterally projecting from said stem, a mechanism seated for rotation within said casing and actuated by said stud in response to axial movement of said stem to translate a short movement of the stud into an extended rotation of said mechanism, a permanent magnet on and rotatable with said mechanism, an indicator mounted on said casing, said indicator having a spindle in axial alignment with said permanent magnet, a similar magnet on said spindle adjacent the casing wall, a graduated dial, and a pointer on said spindle adjacent said dial.

2. A pressure indicating device comprising, a pair of bellows, a stem interconnecting said bellows, a dial indicator having a spindle, a pointer on said spindle, a stud laterally projecting from said stem, a mechanism between said stud and the said spindle for translating a relatively short movement of said stud into a relatively extended rotation of the spindle, said mechanism including a shaft in axial alignment with said spindle, a pinion on said shaft, a gear segment in mesh with said pinion, a stud projecting from said segment above the stud of the stem and in parallel relation thereto, and an arm pivotally hung below said stem in contact with both of said studs, a short movement of the stud of the stem in response to expansion of one of said bellows relative to the other imparting an increased movement to the stud of the segment, thereby to impart oscillating movement to the latter translated into increased rotation of said pinion.

3. A pressure indicating device comprising, a pair of bellows, a stem interconnecting said bellows, a dial indicator having a spindle, a pointer on said spindle, a stud laterally projecting from said stem, a mechanism between said stud and the said spindle for translating a relatively short movement of said stud into a relatively extended rotation of the spindle, said mechanism including a shaft in axial alignment with said spindle, a pinion on said shaft, a gear segment in mesh with said pinion, a stud projecting from said segment above the stud of the stem and in parallel relation thereto, an arm pivotally hung below said stem in contact with both of said studs, a short movement of the stem stud in response to expansion of one of said bellows relative to the other imparting an increased movement to the stud of the segment, thereby to impart oscillating movement to the latter translated into increased rotation of said pinion, and means for adjusting the position of the pivot of said arm, thereby to vary the rotating movement of said pinion relative to the axial movement of the stem.

4. A pressure indicating device comprising, a pair of large bellows, a stem connected at each end to one end wall of each of said bellows and axially movable in response to expansion of one of said bellows relative to contraction of the other, the other end of each of the bellows being rigidly held within the device thereby to form a closed chamber therein, a dial indicator having a spindle, a pointer on said spindle, a stud on said stem, mechanism operatively interconnecting said stud with the said spindle to impart relatively extensive rotation to the spindle in response to relatively short movement of said stud, and a pair of small bellows secured to the ends of the stem outside of the large bellows, the space within said small bellows communicating with the space within the large bellows, a body of liquid filling all of the space within the bellows, the small bellows being free to expand or contract outside of the space within the large bellows in response to temperature variations within the bellows.

DAVID P. BROWN.

REFERENCES CITED

The following references are of record in the file of this patent:

UNITED STATES PATENTS

| Number | Name | Date |
|---|---|---|
| 1,319,241 | Nassen | Oct. 21, 1919 |
| 1,416,210 | Jung et al. | May 16, 1922 |
| 1,847,086 | Gargan | Mar. 1, 1932 |

FOREIGN PATENTS

| Number | Country | Date |
|---|---|---|
| 292,859 | Great Britain | June 28, 1928 |